US007974772B2

(12) United States Patent
Nitz et al.

(10) Patent No.: US 7,974,772 B2
(45) Date of Patent: Jul. 5, 2011

(54) METHOD FOR PROVIDING DRIVING OPERATION DATA

(75) Inventors: Gregor Nitz, Olching (DE); Felix Klanner, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 12/718,315

(22) Filed: Mar. 5, 2010

(65) Prior Publication Data

US 2010/0161173 A1 Jun. 24, 2010

Related U.S. Application Data

(63) Continuation of application No. PCT/EP2008/006680, filed on Aug. 14, 2008.

(30) Foreign Application Priority Data

Sep. 7, 2007 (DE) ........................ 10 2007 042 793

(51) Int. Cl.
*G08G 1/00* (2006.01)
*G08G 1/123* (2006.01)
*G01S 3/02* (2006.01)

(52) U.S. Cl. .................... 701/117; 340/995.13; 342/456

(58) Field of Classification Search .................... 701/33, 701/200–226, 17, 18, 19, 24–26, 32, 117, 701/116, 118, 119, 301, 302; 340/988–996, 340/902, 903, 904, 905, 995.1–995.13, 995.28; 342/454–458, 461, 463

See application file for complete search history.

(56) References Cited

U.S. PATENT DOCUMENTS

| | | | | |
|---|---|---|---|---|
| 5,907,293 | A | 5/1999 | Tognazzini | |
| 6,067,031 | A | 5/2000 | Janky et al. | |
| 6,615,137 | B2 * | 9/2003 | Lutter et al. | 701/301 |
| 6,813,247 | B1 * | 11/2004 | Hassan | 370/252 |
| 6,965,829 | B2 * | 11/2005 | Yamadaji et al. | 701/301 |
| 2002/0198660 | A1 | 12/2002 | Lutter et al. | |
| 2004/0167710 | A1 * | 8/2004 | Fushiki et al. | 701/208 |
| 2004/0230370 | A1 * | 11/2004 | Tzamaloukas | 701/200 |
| 2005/0088318 | A1 | 4/2005 | Liu et al. | |
| 2005/0137756 | A1 * | 6/2005 | Takahashi | 701/1 |
| 2006/0273922 | A1 | 12/2006 | Bhogal et al. | |
| 2007/0027610 | A1 | 2/2007 | Parikh et al. | |
| 2007/0100537 | A1 * | 5/2007 | Parikh et al. | 701/117 |
| 2007/0168129 | A1 | 7/2007 | Thorne | |

FOREIGN PATENT DOCUMENTS

| | | | |
|---|---|---|---|
| DE | 10 2004 053 754 | A1 | 5/2006 |
| DE | 10 2005 017 419 | A1 | 10/2006 |

OTHER PUBLICATIONS

German Search Report with English translation dated Jun. 17, 2008 (nine (9) pages).
International Search Report with English translation dated Nov. 24, 2008 (six (6) pages).

* cited by examiner

*Primary Examiner* — Jack Keith
*Assistant Examiner* — Muhammad Shafi
(74) *Attorney, Agent, or Firm* — Crowell & Moring LLP

(57) ABSTRACT

A method provides driving operation data in a network for wirelessly exchanging driving operation data. A first motor vehicle connected to the network by communication technology determines the absolute driving operation data of a second motor vehicle by way of at least one environment sensor disposed in the first motor vehicle. The absolute driving operation data of the second motor vehicle are transmitted by the first motor vehicle to at least one other subscriber to the network.

11 Claims, 2 Drawing Sheets

METHOD FOR PROVIDING DRIVING OPERATION DATA

CROSS-REFERENCE TO RELATED APPLICATIONS

This application is a continuation of PCT International Application No. PCT/EP2008/006680, filed Aug. 14, 2008, which claims priority under 35 U.S.C. §119 from German Patent Application No. DE 10 2007 042 793.1, filed Sep. 7, 2007, the entire disclosures of which are herein expressly incorporated by reference.

BACKGROUND AND SUMMARY OF THE INVENTION

The invention relates to a method for providing driving operation data in a network for the wireless exchange of driving operation data.

DE 10 2005 017 419 A1 describes a method for the transmission of information relevant to the operation of vehicles. The information is provided by a transmitter unit on a first vehicle in a local region of the first vehicle in a technically analyzable form. The information is received and/or analyzed at least partly by a receiver unit in a second vehicle, when the second vehicle is in the local region of the first vehicle. The vehicles thus provide driving operation data among themselves using wireless communication means.

An indirect provision of driving operation data using infrastructure installations is also known from the prior art. For example, a first motor vehicle can transmit its driving operation data to a stationary infrastructure installation, which transmits the driving operation data of the first motor vehicle to a second motor vehicle after preparing and/or interpreting said data, if appropriate.

However, the reliability and/or availability of devices and methods based on the use of information acquired in such or similar ways relating to driving operation data of other motor vehicles is considerably limited by the fact that only a relatively small portion of all road users is equipped with corresponding communication means.

In known devices and methods, the data of road users that are not equipped with communication devices for transmitting their operational data are not available to other road users and/or infrastructure installations.

DE 10 2004 053 754 A1 discloses a motor vehicle which is able to recognize a reduction in the speed of another preceding road user and to infer a risk of collision between the motor vehicle and the other road user therefrom. However, the reduction in speed or the speed itself is not transmitted to other road users. It is thus not possible to use the invention disclosed for additional purposes in the network.

It is an object of the invention to provide a simple method which enables an improvement in the offering of information made available to a road user.

This object is achieved by a method for providing driving operation data in a network for the wireless exchange of driving operation data. A first motor vehicle connected to the network by communication technology determines the absolute driving operation data of a second motor vehicle by way of at least one environment sensor disposed in the first motor vehicle. The absolute driving operation data of the second motor vehicle are transmitted by the first motor vehicle to at least one other subscriber to the network. Advantageous embodiments and improvements of the invention are described herein.

The invention extends the database that can be used in the network.

In the present invention, absolute driving operation data of a motor vehicle are initially determined by another motor vehicle and then disseminated by this other motor vehicle in a communication network.

The term "absolute driving operation data of a motor vehicle" is understood to mean operational data of this motor vehicle, which relate exclusively to this motor vehicle such as the absolute travel speed of this motor vehicle and/or an absolute position of this motor vehicle. In contrast, speeds relative to the "measuring" motor vehicle are not regarded as absolute driving operation data of a motor vehicle that is "measured" by another motor vehicle. Preferably, the absolute driving operation data are determined in that driving operation data of the "measured" vehicle relative to the "measuring" vehicle (e.g., a relative speed between the "measured" and "measuring" motor vehicle) are evaluated together with known absolute driving operation data of the "measuring" motor vehicle. The absolute driving operation data of the "measuring" motor vehicle can be determined, for example, by way of a tachometer and/or a satellite-based positioning system.

For additionally disseminating the absolute driving operation data of the "measured" motor vehicle, the "measuring" motor vehicle is connected to the network with the aid of communication technology. This connection is preferably carried out by a radio module.

According to the invention, an environment sensor system of the motor vehicle connected to the network with the aid of communication technology is used for the measurement. The environment sensor system preferably includes at least one radar or LIDAR [Light Detection and Ranging] sensor or an image-processing unit.

The "measured" motor vehicle is preferably located in the immediate vicinity of the "measuring" motor vehicle, at least in the range of the environment sensor system of the latter. The "measured" motor vehicle preferably travels directly in front of the "measuring" motor vehicle or directly behind the "measuring" motor vehicle.

The absolute driving operation data are preferably transmitted in the network in such a way that they can be attributed to a defined motor vehicle or at least an individual motor vehicle. This can be implemented, for example, in that the absolute position of the "measured" motor vehicle is determined and transmitted promptly or optionally together with a time specification. With sufficient accuracy of the position specification, it is possible to clearly attribute the absolute driving operation data to the respective "measured" motor vehicle since no other motor vehicle can be located at the exact same location at the same time.

The absolute driving operation data transmitted in the network are preferably evaluated by at least one subscriber to the network, in particular an infrastructure installation, attributing said data to a defined motor vehicle or at least an individual motor vehicle. For example, a model can be built in which the positions and routes of individual motor vehicles are modeled.

According to a preferred embodiment of the present invention, the "measuring" motor vehicle, also referred to hereinafter as the "first motor vehicle," additionally determines absolute driving operation data of the first motor vehicle by way of at least one of its own sensors disposed in the first motor vehicle, and these absolute driving operation data of the first motor vehicle are transmitted by the first motor vehicle to at least one other subscriber to the network. The first motor vehicle thus provides in the network not only the driving operation data of the "measured" motor vehicle, also referred to hereinafter as "second motor vehicle," but also its own driving operation data.

The other subscriber to the network, to which the driving operation data of the second, and optionally also the first, motor vehicle are transmitted, can be formed particularly as a third motor vehicle. The driving operation data of the second motor vehicle can then be evaluated, for example, by a driver assistance system of the third motor vehicle.

Alternately or additionally, the driving operation data of the second, and optionally also the first, motor vehicle can also be transmitted to an infrastructure installation. Such an infrastructure installation in turn transmits the driving operation data of the second motor vehicle and/or traffic information derived from these driving operation data to at least one third motor vehicle. Naturally, several infrastructure installations communicating among each other can also be provided in a network. An information flow can then also be carried out from the first motor vehicle to a third motor vehicle by way of several infrastructure installations.

Preferably, the driving operation data of the second motor vehicle are transmitted by the first motor vehicle only if the second motor vehicle is not connected to the network with the aid of communication technology. It is thus possible to prevent unnecessary communication if the second motor vehicle provides its driving operation data by itself in the network anyway or is at least able to do so.

In order to determine whether the second motor vehicle provides its driving operation data by itself in the network, the first motor vehicle can have means for receiving communication data from subscribers to the network and additionally an evaluation unit for determining whether the second motor vehicle by itself communicates communication data in the network that correspond, in terms of content, to the driving operation data, which are determined by the first motor vehicle and which relate to the second motor vehicle. Consequently, it can be advantageous if the first motor vehicle transmits the driving operation data of the second motor vehicle only if the evaluation unit determines that the second motor vehicle does not communicate any communication data in the network that correspond to these driving operation data in terms of content.

According to an alternately or additionally applicable preferred embodiment of the present invention, the first motor vehicle likewise includes devices for receiving communication data from subscribers to the network and the first motor vehicle includes an evaluation unit to determine whether communication data, which the first motor vehicle receives using these devices from an infrastructure installation, are based on data that correspond, in terms of content, to the driving operation data determined by the first motor vehicle. Advantageously, the driving operation data of the second motor vehicle are transmitted by the first motor vehicle in the network only if the evaluation unit determines that the communication data are not based on data that correspond to the driving operation data in terms of content. A redundant provision of data can thus also be prevented in cases where the driving operation data of the second motor vehicle are indeed not directly received by the first motor vehicle, but are already taken into account in the model of an infrastructure installation.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
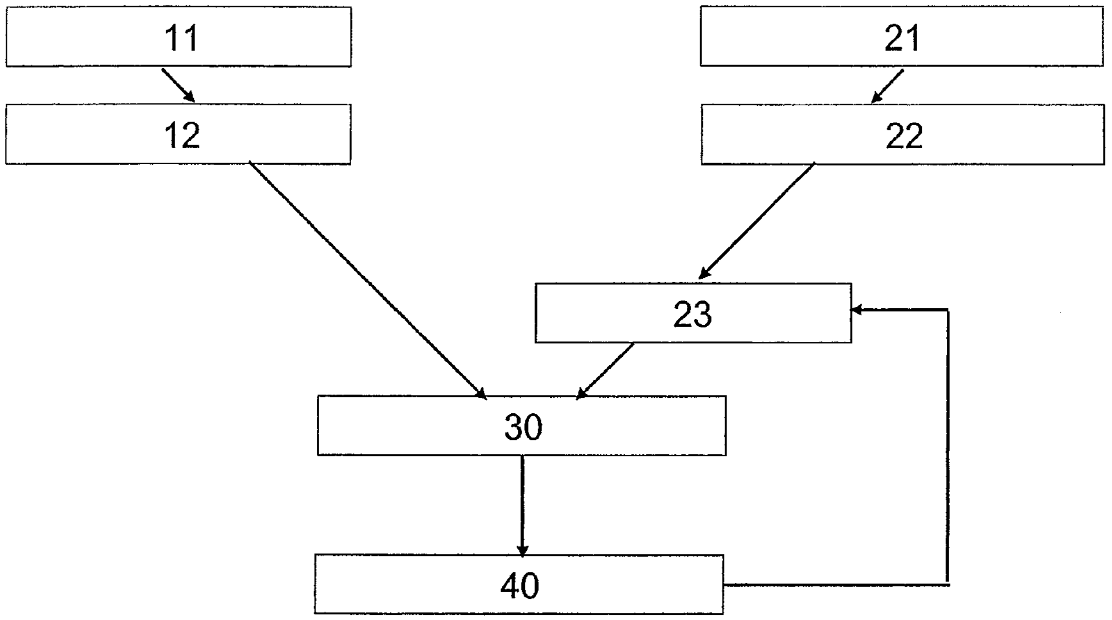
FIG. 1 is a flowchart for a preferred exemplary embodiment of the invention.

In order to increase road safety and convenience in vehicle guidance, systems have been disclosed in the prior art that detect defined data (e.g., position and speed) of other objects, particularly other road users with the help of environment sensors—also referred to here as vehicle-autonomous sensors—disposed in the vehicle. However, this form of data collection is possible only as long as there exists intervisibility to such an object and the range of the sensors is sufficient. One example of data acquired with the aid of environment sensors is distance data used in driver assistance systems such as ACC (Adaptive Cruise Control).

For detecting objects that are hidden from vision and disposed farther than the range of vehicle-autonomous sensors, it is recommended to use radio technology (e.g., IEEE802.11p) and optionally other technologies for wireless information transfer. Such technologies form the basis for enabling data exchange between individual road users (C2C=Car-to-Car) and between road users and infrastructure installations (C2X). The prerequisite for data exchange is that an object or road user be equipped with a corresponding communication device.

The performance, availability and reliability of all traffic control, traffic information and driver assistance systems, which depend on radio technologies, are greatly dependent on the extent to which road users are equipped with corresponding radio hardware and software. Thus, in many prototypical driver assistance systems, full performance is achieved when an equipment rate is achieved. Particularly cooperative driver assistance systems used, for example, for recognizing and preventing potential collisions between two objects (e.g., communication-based intersection assistant [KQA; Kommunikationsbasierter Querverkehrsassistent] of the BMW Group Research and Technology, introduced in the "Aachen Colloquium" 2006), require the data of all relevant objects in the vicinity in addition to the data of the subject vehicle. The subject-vehicle data can be detected using vehicle-autonomous sensors. In contrast, it is usually not possible to collect data of all relevant objects with the aid of only vehicle-autonomous sensors disposed in the subject vehicle.

The availability of the driving operation data of individual road users to other road users and/or to an infrastructure installation can additionally be limited by the fact that the communication devices used for the transmission fail or are defective.

In the present exemplary embodiment of the invention, driving operation data of additional road users are provided. A first motor vehicle equipped with a communication device detects driving operation data of at least one second motor vehicle, which is present in the vicinity of the first motor vehicle, with the aid of its own sensors and disseminates these driving operation data of the second motor vehicle in a network by use of the communication device. In the simplest case, the network can only include the first motor vehicle and a third motor vehicle, to which the first motor vehicle transmits driving operation data of the second motor vehicle. The network can also include at least one infrastructure installation and a plurality of other road users. The driving operation data of the second motor vehicle are then transmitted by the first motor vehicle to the infrastructure installation. In the present example, other road users likewise transmit driving operation data of many other road users to the infrastructure installation. The infrastructure installation distributes the received driving operation data in the network, either independently, or on request and/or it carries out an interpretation of all the driving operation data received, acquires traffic information therefrom, and distributes the same in the network independently or on request. For acquiring traffic information, the driving operation data collected can be incorporated into a traffic flow model, in particular.

Preferably, the driving operation data of the second motor vehicle are disseminated in the network together with driving operation data of the first motor vehicle. This then does not necessitate any additional communication channel or any additional addressing.

A performance increase can be achieved in that the driving operation data of the second motor vehicle are disseminated in the network by the first motor vehicle only if the second motor vehicle cannot do so by itself for want of a suitable communication device, or if a corresponding communication device of the second motor vehicle is not ready for operation in an actual situation.

A performance increase can also be achieved in that the driving operation data of the second motor vehicle are disseminated in the network by the first motor vehicle only if these driving operation data are relevant to other subscribers to the network in the actual situation according to the invention. This can depend particularly on the position, travel direction and travel speed of the other subscribers to the network.

FIG. 1 illustrates the functional principle of an exemplary system. A motor vehicle corresponding to the first motor vehicle cited above is equipped with vehicle sensors and a radio module. The motor vehicle is connected by way of its radio module to a communication system.

Vehicle sensors 11 of the motor vehicle detect subject-vehicle data of the motor vehicle (e.g., its own travel speed), which are provided via the radio module to the communication system 40 after being subjected to evaluation and interpretation by an evaluation and interpretation unit 12 and a relevance assessment by a relevance assessment unit 30.

The communication system 40 includes the subject vehicle and all objects (e.g., other vehicles and infrastructure installations) which are present in the radio range of the subject vehicle and are equipped with a radio module and which likewise provide their data, referred to hereinafter as "object data," to the communication system 40. Based on these object data, an environment model can be generated in the subject vehicle and/or at least one of the objects and/or even each individual object.

For monitoring the immediate vicinity of the vehicle, a defined number of environment sensors 21 are further installed on the subject vehicle. If an object (e.g., another vehicle corresponding to the second motor vehicle cited above) is present within the range of the environment sensors 21, measurement data (e.g., relative speed) relating to this object are detected by the subject vehicle and evaluated and interpreted in an evaluation and interpretation unit 22. As a result of these process steps, the subject vehicle can determine object data of the object (e.g., driving operation data of the second motor vehicle such as its absolute velocity, for example).

In order to determine whether the respective object has a functional radio module, the object data determined in this way can be compared in a comparison unit 23 of the subject vehicle with those object data that the subject vehicle itself has received via the radio module from other subscribers to the communication system 40. If no object data are received from an object detected in the vicinity of the subject vehicle, then it is inferred that this object does not have a functional radio module. The subject vehicle acts in representation of the object to some extent and provides the object data that relate to the object and are determined by the former to the communication system following a relevance check, if appropriate.

One possible advantage in extending the broadcast content provided by the subject vehicle in the communication system to include the object data of other objects located in the vicinity of the subject vehicle is that the vehicle-autonomous sensors and/or algorithms required for determining these object data are already provided anyway in the vehicle for purposes of other driver assistance systems (e.g., front radar in ACC and rear radar in lane-change assistance systems). The additional measuring expenditure and computational costs are therefore relatively low.

The radio data received from the subject vehicle are used here to determine whether the related object has a functional radio module. The advantage here is that the object data of the related object are firstly transmitted by way of the communication system 40 and secondly by way of the vehicle-autonomous environment sensors 21 disposed in the subject vehicle. This is because the vehicle-autonomous sensors 21 of the subject vehicle detect an object, but no data are received from this object via the communication system 40, so it can be assumed that the object has no radio module or no functional radio module.

In case of doubt, it can be advantageous and useful for overall security to disseminate the object data of a detected object in the communication system 40 even if it cannot or could not be determined with absolute certainty whether this object provides its object data by itself.

It can also be advantageous if the object data, which an object sends, are provided with an identification feature, if the object additionally has an external characteristic which can also be determined by the environment sensors 21 of the subject vehicle, and if the identification feature and the external characteristic can be attributed to each other. For example, a vehicle can send a code derived from the inscription of its license plate as the identification feature together with its driving operation data. If the subject vehicle, which has a camera as an environment sensor 21, now determines the inscription of the license plate of another vehicle with the help of image processing and derives the same code therefrom, it can be inferred that this vehicle is equipped with a radio module and that it is sending its driving operation data by itself.

Alternately, a vehicle can send a code derived from its overall size and/or its body paint color as the identification feature together with its driving operation data. If the subject vehicle, which has a camera as an environment sensor 21, now determines, with the help of image processing, the overall size and/or body paint color of another vehicle in its vicinity and derives approximately the same code therefrom, then it can be inferred that this vehicle is highly likely to be equipped with a radio module and that it is sending its driving operation data by itself.

Likewise, the subject vehicle aware of its own absolute position can, at least approximately, determine the absolute position of another vehicle by way of an environment sensor system. If the subject vehicle now receives, by radio, object data describing an object having this exact absolute position, or if it receives object data containing additional position data that serve as an identification feature and correspond to this absolute position, then it can be inferred therefrom that this vehicle is equipped with a radio module and that it is sending its driving operation data by itself.

Figure 2:
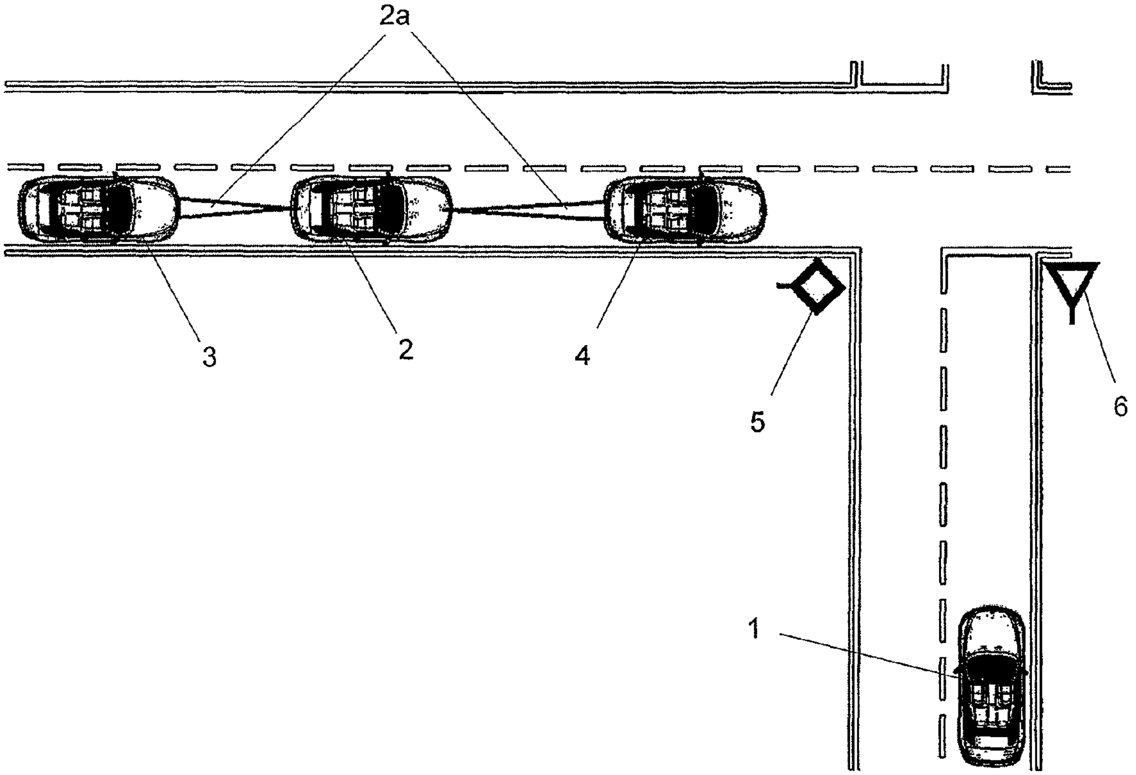
FIG. 2 is a traffic situation in which the invention proves to be particularly advantageous.

Reference should be made to the traffic situation shown in FIG. 2 as an example of the additional value of extending the radio contents to include the data of other objects. A vehicle 1 obligated to wait (symbol 5) and three vehicles 2, 3 and 4 having the right of way (symbol 6) approach an intersection. Vehicle 1 and vehicle 2 are each equipped with a radio module. The vehicle 2 additionally has vehicle-autonomous sensors (e.g., radars in the front and rear regions). The vehicles 3 and 4 do not have any radio modules.

The driver of the vehicle 1 interprets the traffic regulation incorrectly. It is therefore assumed that the vehicle 1 is on a collision course with vehicle 4. The vehicle 2 detects driving operation data of vehicle 4 (e.g., absolute position and velocity) based on vehicle-autonomous sensors of the vehicle 2; radar lobes 2*a* are shown in the front and rear regions of the vehicle 2 in FIG. 2. The vehicle 2 transmits these driving operation data of the vehicle 4 together with the driving operation data of the vehicle 2 determined by use of its own sensors to the vehicle 1 via the radio module. The vehicle 1 can thus receive the driving operation data of the vehicle 4 via the radio module although the vehicle 4 itself does not have a radio module.

The use of vehicle-autonomous sensors as suggested by the invention together with a radio module thus enables to a certain extent a virtual increase in the rate at which the vehicles are equipped with radio modules. Assuming that only one radar is used in the front and rear regions of the subject vehicle and exclusively those objects are taken into account that travel on the same lane as the subject vehicle, the equipment rate can virtually be increased by two hundred percent. If the objects traveling on the adjoining lane are also taken into account, the virtual equipment rate can be increased still further.

One important criterion for launching radio-based driver assistance systems on the market is the performance, reliability, and availability expected in the case of a low pervasiveness of the system. Since all these quality measures increase as the rate at which vehicles are equipped with radio modules increases, the virtual increase in the equipment rate achieved according to the invention supports the market launch of such systems. The suggested method offers additional advantages in the case of a high rate at which vehicles are equipped with radio modules. Thus, for example, the data of a vintage car that is not equipped with a radio module can be detected with the aid of the vehicle-autonomous sensors of a modern subject vehicle equipped with a radio module and thus made available by way of the communication system.

A regulation for creating a financial balance between the passive and the actively communicating participants of a method of the invention is also feasible. The purchase of a radio module can thus be promoted financially in a collective effort. For this purpose, it is also optionally possible to maintain a log, even in the case of an infrastructure installation, identifying the vehicle providing maximum driving operation data of other vehicles. For this purpose, the driving operation data transmitted can be provided with an identifier of the sender.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for providing driving operation data in a network that wirelessly exchanges driving operation data, the method comprising the acts of:

determining, by a first motor vehicle coupled to the network via a communication interface, absolute driving operation data of a second motor vehicle using at least one environment sensor operatively arranged in the first motor vehicle; and transmitting, by said first motor vehicle, said absolute driving operation data of the second motor vehicle for use by at least one other subscriber to the network, wherein said absolute driving operation data is attributable specifically to the second motor vehicle by such at least one other subscriber, and wherein the absolute driving operation data of the second motor vehicle are transmitted by the first motor vehicle only if the second motor vehicle is not connected to the network by a communication interface.

2. The method according to claim 1, wherein the first motor vehicle further determines absolute driving operation data of the first motor vehicle by at least one sensor disposed in the first motor vehicle, and transmits said absolute driving operation data of the first motor vehicle for use by said at least one other subscriber to the network.

3. The method according to claim 2, wherein the at least one other subscriber to the network is a third motor vehicle, and wherein the driving operation data of the second motor vehicle are used for evaluation at least partly by at least one driver assistance system of the third motor vehicle.

4. The method according to claim 2, wherein the at least one other subscriber to the network is an infrastructure installation, and wherein the infrastructure installation transmits at least one of the driving operation data of the second motor vehicle and traffic information derived from said driving operation data to at least one third motor vehicle.

5. The method according to claim 1, wherein the at least one other subscriber to the network is a third motor vehicle, and wherein the driving operation data of the second motor vehicle are used for evaluation at least partly by at least one driver assistance system of the third motor vehicle.

6. The method according to claim 1, wherein the at least one other subscriber to the network is an infrastructure installation, and wherein the infrastructure installation transmits at least one of the driving operation data of the second motor vehicle and traffic information derived from said driving operation data to at least one third motor vehicle.

7. The method according to claim 1, wherein the driving operation data of the second motor vehicle describe at least an absolute velocity thereof.

8. The method according to claim 1, wherein the driving operation data of the second motor vehicle describe at least an absolute position thereof.

9. The method according to claim 1, wherein at least one of:

the at least one environment sensor disposed in the first motor vehicle is formed as a radar sensor, a LIDAR sensor, or an image-processing unit, and the network is formed as a radio network and the first motor vehicle is connected to said radio network via a radio module.

10. A method for providing driving operation data in a network that wirelessly exchanges driving operation data, the method comprising the acts of:

determining, by a first motor vehicle coupled to the network via a communication interface, absolute driving operation data of a second motor vehicle using at least one environment sensor operatively arranged in the first motor vehicle; and transmitting, by said first motor vehicle, said absolute driving operation data of the second motor vehicle for use by at least one other subscriber to the network, wherein said absolute driving operation data is attributable specifically to the second motor vehicle by such at least one other subscriber, and wherein the first motor vehicle comprises devices for receiving communication data from subscribers to the network, the first motor vehicle comprises an evaluation unit for determining whether the second motor vehicle by itself communicates communication data in the network that correspond, in terms of content, to the driving operation data determined by the first motor vehicle, and the driving operation data of the second motor vehicle are transmitted by the first motor vehicle only if the evaluation unit determines that the second motor vehicle does not communicate any communication data in the network that correspond, in terms of content, to the driving operation data.

11. A method for providing driving operation data in a network that wirelessly exchanges driving operation data, the method comprising the acts of:

determining, by a first motor vehicle coupled to the network via a communication interface, absolute driving operation data of a second motor vehicle using at least one environment sensor operatively arranged in the first motor vehicle; and transmitting, by said first motor vehicle, said absolute driving operation data of the second motor vehicle for use by at least one other subscriber to the network, wherein said absolute driving operation data is attributable specifically to the second motor vehicle by such at least one other subscriber, and wherein the first motor vehicle comprises devices for receiving communication data from subscribers to the network, the first motor vehicle comprises an evaluation unit for determining whether communication data, which the first motor vehicle receives from an infrastructure installation, are based on data that correspond, in terms of content, to the driving operation data determined by the first motor vehicle, and the driving operation data of the second motor vehicle are transmitted by the first motor vehicle only if the evaluation unit determines that the communication data are not based on data that correspond, in terms of content, to the driving operation data.

* * * * *